United States Patent Office …

2,993,027
Patented July 18, 1961

2,993,027
COMPOSITION COMPRISING CHLORINATED BUTYL RUBBER AND INTERPOLYMER OF BUTADIENE, A VINYL PYRIDINE AND AN OLEFINIC NITRILE, AND PROCESS FOR PREPARING SAME
Alfred L. Miller, Cranford, Irving Kuntz, Roselle Park, and Francis P. Baldwin, Colonia, N.J., assignors to Esso Research and Engineering Company, a corporation of Delaware
No Drawing. Filed Dec. 27, 1956, Ser. No. 630,768
4 Claims. (Cl. 260—45.5)

This invention relates to vulcanized rubbery polymeric compositions which comprise chlorinated rubbery copolymers of isoolefins and multiolefins and to improvements in vulcanizing chlorinated butyl rubber. More particularly, the present invention relates to an improved process for producing high modulus, hard vulcanizates of chlorinated butyl rubber by vulcanizing the same in admixture with certain vinyl pyridine copolymers.

The chlorinated butyl rubber to be used in accordance with the instant invention is prepared by mild chlorination of the unvulcanized rubber at temperatures of above 0° C. as more fully described hereinafter. Such a rubber before chlorination is essentially a vulcanizable rubbery hydrocarbon copolymer containing about 85 to 99.5%, preferably 95–99.5% of a $C_4$—$C_8$ isoolefin such as 2-methyl-1-butene, 3-methyl-1-butene, or especially isobutylene, the remainder being a $C_4$—$C_{14}$ multiolefin, preferably a $C_4$ to $C_6$ conjugated diolefin such as butadiene, dimethyl butadiene, piperylene or especially isoprene. The resulting copolymer generally has a Staudinger molecular weight of about 20,000 to 150,000, a mole percent unsaturation of between about 0.5 to 15.0, and an iodine number of about 0.5 to 50.0 (Wijs). The prepartion of butyl rubber is described in U.S. Patent 2,356,128 to Thomas et al. and also in other patents as well as in the literature.

It has now been discovered that when chlorinated butyl rubber is vulcanized in admixture with certain vinyl pyridine copolymers, vulcanizates are produced which exhibit extremely high extension modulus and hardness. Such high modulus, hard vulcanizates are especially desirable for use in the bead area of tires.

In practicing the present invention, about 5 to 99 parts by weight of chlorinated butyl rubber are compounded with about 95 to 1 parts by weight, advantageously about 75 to 3 parts by weight, and preferably about 50 to 5 parts by weight of a copolymer of a major proportion of a $C_4$—$C_{14}$ multiolefin such as butadiene, isoprene, dimethyl butadiene, piperylene, or the like, and a minor proportion but at least about 5.0 weight percent based on copolymer of certain vinyl pyridine compounds or mixtures of such compounds with polymerizable olefinic nitrile compounds. The vulcanization of such compositions, preferably containing a major proportion of the chlorinated butyl rubber, in accordance with the present invention, is generally for about 1 to 200 minutes and preferably for about 5 to 100 minutes at temperatures of between about 200° and 450° F., and preferably at temperatures of between about 250° and 400° F. (e.g. 275°–350° F.). The compositions to be vulcanized may also advantageously contain, per 100 parts by weight of total polymer, about 20 to 200, advantageously about 25 to 150, and preferably about 30 to 80 parts by weight of a filler such as carbon blacks, clays, silica, diatomaceous earth, or the like; about 0.5–20, preferably about 0.8–15 parts by weight of a compound containing oxygen, and a bivalent metal such as zinc oxide, zinc stearate, or the like; about 0.5–10, preferably about 1 to 5 parts by weight of sulfur; and about 0.3 to 5.0, preferably about 0.5 to 3.0 parts by weight of an ultra-accelerator such as derivatives of thiocarbamic acid, including tetraalkyl thiuram sulfides and/or metal dialkyl dithiocarbamates, or the like. The compositions to be vulcanized also may optionally contain about 0.1–5 parts by weight of an antioxidant such as N-lauryl p-amino phenol, 2,2′-methylene-bis(4-methyl-6-tertiary butyl phenol), 2,6-ditertiary butyl p-cresol, or the like, and about 0.1 to 3.0 parts by weight of a processing aid or mold release agent such as stearic acid.

The vinyl pyridine compounds suitable for use in accordance with the present invention include such compounds as 2-vinyl pyridine; 3-vinyl pyridine; 4-vinyl pyridine; or the like and/or $C_1$—$C_6$ alkyl vinyl pyridines such as 2-methyl-5-vinyl pyridine; 5-ethyl-2-vinyl pyridine; 2-methyl-6-vinyl pyridine; 1-ethyl-3-vinyl pyridine; 2,4-dimethyl-6-vinyl pyridine, etc. Suitable polymerizable olefinic nitrile compounds include acrylonitrile, methacrylonitrile, crotononitrile, 1-cyano-1,3-butadiene, vinylidene cyanide, 1-cyano-cyclohexene-1, etc.

Chlorinated butyl rubber is produced by mild chlorination of the unvulcanized hydrocarbon copolymer in a manner which does not degrade the molecular weight thereof, but sufficiently to produce a rubber which retains its tensile strength upon heat-aging. The chlorination is preferably carried out so as to make the resultant chlorinated butyl rubber contain about at least 0.5 weight percent (preferably at least about 1.0 weight percent) combined chlorine, but not more than about "X" weight percent combined chlorine wherein:

$$X = \frac{35.46L}{(100-L)M_1 + L(M_2+35.46)} \times 100$$

and $L$ = mole percent of the multiolefin in the polymer
$M_1$ = molecular weight of the isoolefin
$M_2$ = molecular weight of the multiolefin
35.46 = atomic weight of chlorine Restated, there should be at least about 0.5 weight percent of combined chlorine in the polymer but not more than about one atom of chlorine combined in the polymer per molecule of multiolefin present therein; i.e., not more than about one atom of combined chlorine per double bond in the polymer. The maximum mole percent of combined chlorine is generally about 0.25 to about 1.0 times the mole percent unsaturation of the polymer. Normally, the chlorine content of chlorinated copolymers containing up to about 15% combined multiolefin should be within about 0.1 to 10.0% chlorine, preferably about 0.5 to 3.0% chlorine based on the total weight of rubbery copolymer.

Suitable chlorinating agents which may be employed are chlorine, alkali metal hypochlorites, oxygenated sulfur chlorides, pyridinium chloride perchloride, alpha-chloroaceto-acetanilide, beta-chloro-methyl phthalimide, and other common chlorinating agents. The preferred chlorinating agents are molecular chlorine, N-chlorosuccinimide, chloro-hydantoins and sulfuryl chloride. The chlorination is conducted at temperatures of above 0° up to about 100° C. and preferably at about 20° to 60° C. for about one minute to several hours. However, the temperatures and times are regulated to chlorinate the rubbery copolymer to the extent above-mentioned.

The chlorination is accomplished by preparing a solution of the above rubbery copolymer in an inert liquid solvent such as an inert hydrocarbon or advantageously halogenated derivatives of saturated hydrocarbons, examples of which are hexane, naphtha, mineral spirits, benzene, chloroform carbon tetrachloride, etc., and adding thereto chlorine or other chlorinating agent, optionally in solution, such as dissolved in an alkyl chloride, carbon tetrachloride, etc. The use of elevated or depressed pressures is optional since atmospheric pressure is satisfactory although the pressure may vary, depending upon the foregoing temperatures and times from about 1 to 400 p.s.i.a.

The concentration of the butyl rubber in the solvent will depend upon the type of reactor, molecular weight of the butyl rubber, etc. In general, the concentration of a butyl rubber having a viscosity average molecular weight of about 100,000 to about 800,000, if the solvent is a substantially inert hydrocarbon, will be between about 1 and 80% by weight, preferably about 5 to 60%.

When chlorinating butyl rubber with gaseous chlorine, the chlorine gas may also be diluted with up to about 20 times its volume, preferably about 0.1 to 5.0 times its volume of an inert gas such as nitrogen, methane, ethane, carbon dioxide, etc. In chlorinating the butyl rubber with gaseous chlorine in batch procedure, the chlorine is preferably added relatively slowly to a preformed solution of the butyl rubber with agitation. The chlorine is advantageously added over a period of about 1 to 20 minutes depending upon the degree of agitation. The amount of gaseous chlorine added to a butyl rubber copolymer dissolved in a completely inert hydrocarbon is approximately twice that which is desired to be combined with the butyl polymer, since for one mole of chlorine, one chlorine atom combines with the polymer essentially by replacing a hydrogen atom from said polymer and the other atom is evolved as hydrogen chloride.

In order to more fully illustrate the present invention, the following experimental data are given:

*Example I*

A chlorinated butyl rubber copolymer was compounded and vulcanized with the various amounts of a copolymer containing 85 weight percent butadiene and 15 weight percent of 2-methyl 5-vinyl pyridine (hereinafter referred to as vinyl pyridine copolymer "A"). The chlorinated butyl rubber used was produced by chlorinating butyl rubber dissolved in hexane at room temperature with gaseous chlorine. The chlorinated butyl rubber formed had an 8-minute Mooney viscosity at 212° F. of 68, a mole percent unsaturation of 1.43, a viscosity average molecular weight of 395,000, and contained 1.55 weight percent combined chlorine. Various amounts in parts by weight of the foregoing chlorinated butyl rubber were then compounded in a 2-roll commercial rubber mill at a roll temperature of 100° F. with the various amounts given hereinafter of vinyl pyridine copolymer "A" and also with the following:

| Component: | Parts by weight |
|---|---|
| Carbon black (SRF) | 50 |
| Stearic acid | 0.5 |
| 2,2'-methylene bis(4-methyl-6-tertiary butyl phenol) | 1.0 |
| Zinc oxide | 1.5 |
| Sulfur | 2.0 |
| Tellurium diethyl dithiocarbamate | 1.0 |

The amounts of chlorinated butyl rubber and vinyl pyridine copolymer "A" were as follows:

| Runs | Parts by weight | | | | | |
|---|---|---|---|---|---|---|
| | A | B | C | D | E | F |
| Component: | | | | | | |
| Chlorinated Butyl rubber | 100 | 95 | 90 | 80 | 70 | 50 |
| Vinyl pyridine copolymer "A" | | 5 | 10 | 20 | 30 | 50 |

All samples were then cured at 307° F. for 40 minutes, the resulting physical inspections being as follows. In all instances, the tensile strengths were found to be above 1000 p.s.i.

| Runs | A | B | C | D | E | F |
|---|---|---|---|---|---|---|
| Extension modulus at 100% elongation (p.s.i.) | 150 | 400 | 625 | 775 | 750 | 1,200 |
| Shore A hardness | 45 | 70 | 75 | 68 | 65 | 70 |

The above data show that chlorinated butyl rubber when vulcanized in the presence of a vinyl pyridine copolymer exhibits greater hardness and a higher extension modulus compared to chlorinated butyl rubber vulcanized by the same curatives but in the absence of added vinyl pyridine copolyer.

*Example II*

The same general procedure, compounding, and vulcanization conditions as in Example I were repeated, substituting for vinyl pyridine copolymer "A" a copolymer of 75 weight percent of butadiene and 25 weight percent of 2-methyl-5-vinyl pyridine (hereinafter referred to as vinyl pyridine copolymer "B"). The various proportions of ingredients to be vulcanized and the resulting physical properties of the vulcanizates cured in accordance with Example I were as follows. In all instances, the tensile strengths were found to be above 1,000 p.s.i.

| Runs | Parts by weight | | | | | |
|---|---|---|---|---|---|---|
| | G | H | I | J | K | L |
| Component: | | | | | | |
| Chlorinated butyl rubber | 100 | 95 | 90 | 80 | 70 | 50 |
| Vinyl pyridine copolymer "B" | | 5 | 10 | 20 | 30 | 50 |
| Extension modulus at 100% elongation (p.s.i.) | 150 | 400 | 475 | 855 | 1,175 | 1,275 |
| Shore A hardness | 45 | 75 | 70 | 70 | 72 | 71 |

The data in this example support the same general conclusions as those in Example I.

*Example III*

The same general procedure as in Example I was again repeated, this time employing as the vinyl pyridine copolymer, a tripolymer containing 70 weight percent butadiene, 10 weight percent 2-methyl-5-vinyl pyridine, and 20 weight percent acrylonitrile (hereinafter referred to as vinyl pyridine copolymer "C"). The various amounts of chlorinated butyl rubber, vinyl pyridine copolymer "C," and the resulting extension modulus and Shore A hardness of vulcanizates cured in accordance with Example I were as follows:

| Runs | Parts by weight | | | | | |
|---|---|---|---|---|---|---|
| | M | N | O | P | Q | R |
| Component: | | | | | | |
| Chlorinated butyl rubber | 100 | 95 | 90 | 80 | 70 | 50 |
| Vinyl pyridine copolymer "C" | | 5 | 10 | 20 | 30 | 50 |
| Extension modulus at 100% elongation (p.s.i.) | 150 | 425 | 575 | 850 | 875 | 1,275 |
| Shore A hardness | 45 | 77 | 73 | 70 | 68 | 73 |

The data in this example support the same general conclusions as those in Example I.

Resort may be had to modifications and variations of the disclosed embodiments of the present invention without departing from the spirit of the invention or the scope of the appended claims.

What is claimed is:

1. A composition of matter comprising about 50 to 95 parts by weight of a substituted-chlorine-containing isoolefin-multiolefin butyl rubber copolymer, said polymer containing at least about 0.5 weight percent chlorine on a basis of a total weight of the polymer but not more than about one combined atom of chlorine per double bond in said polymer, substantially all of said chlorine combined in the polymer being present as substituted chlorine, wherein the combined chlorine has replaced a hydrogen atom originally present in said copolymer, said substitution of chlorine being performed at a temperature above 0 to 100° C.; and about 5 to 50 parts by weight of an interpolymer of butadiene; a vinyl pyridine compound selected from the group consisting of 2-, 3-, and 4-vinyl pyridines and mixtures thereof; and an olefinic nitrile compound selected from the group consisting of acrylonitrile, methacrylonitrile, crotononitrile, 1-cyano-1,3-butadiene, vinylidene cyanide, 1-cyano-cyclohexene-1, and mixtures thereof; said composition having been cured to provide a vulcanizate therefrom with a Shore A hardness above about 68.

2. The composition according to claim 1 in which the olefinic nitrile compound is acrylonitrile.

3. A composition of matter comprising about 50 to 95 parts by weight of a substituted-chlorine-containing iso-olefin-multiolefin butyl rubber copolymer, said polymer containing at least about 0.5 weight percent chlorine on a basis of a total weight of the polymer but not more than about one combined atom of chlorine per double bond in said polymer, substantially all of said chlorine combined in the polymer being present as substituted chlorine, wherein the combined chlorine has replaced a hydrogen atom originally present in said copolymer, said substitution of chlorine being performed at a temperature above 0 to 100° C.; and about 5 to 50 parts by weight of a tripolymer of butadiene, 2-methyl-5-vinyl-pyridine, and acrylonitrile; said composition having been cured to provide a vulcanizate therefrom with a Shore A hardness above about 68.

4. An improved process for preparing vulcanized butyl rubber which comprises compounding about 50 to 95 parts by weight of a substituted-chlorine-containing isoolefin-multiolefin butyl rubber copolymer, the chlorine combined in said copolymer being present in amout of at least about 0.5 weight percent based upon copolymer but not more than about 1 atom of combined chlorine per double bond in the copolymer, substantially all of said chlorine combined in the copolymer being present as substituted-chlorine, wherein the combined chlorine has replaced a hydrogen atom originally present in said copolymer, said chlorine substitution being performed at a temperature above 0 to 100° C. with about 5 to 50 parts by weight of a tripolymer of butadiene, 2-methyl-5-vinyl-pyridine, and acrylonitrile; and curing the resulting mixture by heating the same at a temperature level between 250 and 400° F. to provide a vulcanizate therefrom with a Shore A hardness of about 68.

References Cited in the file of this patent

UNITED STATES PATENTS

| | | |
|---|---|---|
| 2,631,984 | Crawford et al. | Mar. 17, 1953 |
| 2,732,354 | Morrissey et al. | Jan. 24, 1956 |
| 2,804,448 | Hallenbeck | Aug. 27, 1957 |
| 2,809,372 | Frederick et al. | Oct. 8, 1957 |
| 2,816,098 | Morrissey | Dec. 10, 1957 |
| 2,857,357 | Smith | Oct. 21, 1958 |